US012145554B2

(12) United States Patent
Tione

(10) Patent No.: US 12,145,554 B2
(45) Date of Patent: Nov. 19, 2024

(54) METHOD FOR MONITORING A COMPRESSOR OF A RAILWAY BRAKING SYSTEM

(71) Applicant: FAIVELEY TRANSPORT ITALIA S.P.A., Turin (IT)

(72) Inventor: Roberto Tione, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 406 days.

(21) Appl. No.: 17/597,016

(22) PCT Filed: Jun. 19, 2020

(86) PCT No.: PCT/IB2020/055768
§ 371 (c)(1),
(2) Date: Dec. 22, 2021

(87) PCT Pub. No.: WO2020/261076
PCT Pub. Date: Dec. 30, 2020

(65) Prior Publication Data
US 2022/0297662 A1    Sep. 22, 2022

(30) Foreign Application Priority Data

Jun. 24, 2019  (IT) .......................... 102019000009897

(51) Int. Cl.
*B60T 17/22* (2006.01)
*B60T 13/66* (2006.01)
*B60T 13/68* (2006.01)

(52) U.S. Cl.
CPC .......... *B60T 17/228* (2013.01); *B60T 13/662* (2013.01); *B60T 13/665* (2013.01); *B60T 13/683* (2013.01); *B60Y 2200/30* (2013.01)

(58) Field of Classification Search
CPC .... B60T 17/228; B60T 13/665; B60T 13/662; B60T 13/683; B60T 17/02; B60Y 2200/30; B60Y 2306/15
See application file for complete search history.

(56) References Cited

U.S. PATENT DOCUMENTS 9,868,430 B2 *  1/2018  Humphrey .......... B61L 15/0072
2010/0036576 A1 *  2/2010  Diekmeyer ............. B60T 17/02
                                                              303/9.66

(Continued)

FOREIGN PATENT DOCUMENTS

CN        101522491 A       9/2009
CN        203666629 U       6/2014

(Continued)

OTHER PUBLICATIONS

WO document No. WO 2005014360 to Detlefs et al published on Feb. 17, 2005.*

(Continued)

*Primary Examiner* — Pamela Rodriguez
(74) *Attorney, Agent, or Firm* — K&L Gates LLP

(57) ABSTRACT

A monitoring method of a compressor for a railway braking system is described, the railway braking system comprising an air generation and treatment module AGTU which includes a compressor, a main tank arranged to supply a main pipe adapted to distribute compressed air to at least one braking subsystem which comprises an auxiliary tank arranged to supply a braking control system;
the monitoring process being characterized in that it comprises the steps of:
monitoring a behavior of at least one pressure value measured downstream of the main tank or measured at the outlet of the auxiliary tank;

(Continued)

deriving the use and/or state of health of the compressor exclusively on the basis of the time behavior of the measured pressure value.

13 Claims, 4 Drawing Sheets

(56) References Cited

U.S. PATENT DOCUMENTS

| | | | |
|---|---|---|---|
| 2016/0075346 A1 | 3/2016 | Wright | |
| 2020/0130659 A1* | 4/2020 | Grasso | B61H 13/20 |
| 2023/0324252 A1* | 10/2023 | Winkler | G01M 3/26 |
| | | | 73/40.5 R |

FOREIGN PATENT DOCUMENTS

| | | |
|---|---|---|
| CN | 106476786 A | 3/2017 |
| CN | 207568820 U | 7/2018 |
| DE | 102005048535 A1 | 4/2007 |

OTHER PUBLICATIONS

Spanish Patent No. ES 2458555 to Gennari et al published on May 6, 2014.*

European Patent No. EP 3328703 to Tione published on May 22, 2019.*

ISA European Patent Office, International Search Report Issued in Application No. PCT/IB2020/055768, Oct. 27, 2020, WIPO, 2 pages.

* cited by examiner

METHOD FOR MONITORING A COMPRESSOR OF A RAILWAY BRAKING SYSTEM

CROSS REFERENCE TO RELATED APPLICATIONS

The present application is a U.S. National Phase of International Application No. PCT/IB2020/055768 entitled "METHOD FOR MONITORING A COMPRESSOR OF A RAILWAY BRAKING SYSTEM," and filed on Jun. 19, 2020. International Application No. PCT/IB2020/055768 claims priority to Italian Patent Application No. 102019000009897 filed on Jun. 24, 2019. The entire contents of each of the above-listed applications are hereby incorporated by reference for all purposes.

TECHNICAL FIELD

The present invention generally lies within the field of railway braking systems; in particular, the invention relates to a method for monitoring a compressor of a railway braking system.

PRIOR ART

In the rail transport system, known braking systems use compressed air which is suitably injected into brake cylinders in order to generate braking force. The compressed air is generated by one or more compressors.

FIG. 1 shows an example of a known railway braking system. This example has been greatly simplified and is used in a purely illustrative manner.

An air generation and treatment module (AGTU; air generation and treatment unit) 100 includes a compressor 101 and a drier assembly 102 arranged downstream of the compressor 101. The drier assembly 102 aims to separate water present in a liquid state and in a vapor state from the compressed air. The drier assembly 102 normally comprises one or more cyclone separators for removing the water in the liquid state, and a salt or aluminum drying system for removing the water in the vapor state.

The compressed air produced by the AGTU group 100 is collected in a main tank 104, via a non-return valve 103.

The main tank 104 in turn supplies a main pipe 105 which distributes the compressed air to one or more braking subsystems 106, 107 . . . arranged along the train, via non-return valves 109, 110. The main pipe 105 also distributes the compressed air to one or more pneumatic suspension systems 108, which are arranged between the bogies and the bodies making up the train and not shown in the figures, via non-return valves 111.

The pneumatic suspension system 108 normally comprises an auxiliary tank 112, a leveling valve 113, a bellows 114, and a pressure sensor means 115. The bellows 114 is mechanically arranged between the relevant bogie and the body, not shown in the figures, so as to act as suspension. The distance between the body and the bogie depends on the pressure present inside the bellows 114. In order to keep said distance between the body and the bogie at a constant value as the weight of the body varies, corresponding to the weight of the passengers varying, a leveling valve 113 which is sensitive to the distance between the relevant bogie and the body acts by increasing the pressure in the bellows 114 when the distance is tending to decrease as a result of an increase in weight, and by reducing the pressure in the bellows 114 by partially discharging the bellows to the atmosphere when the distance is tending to increase as a result of a reduction in weight.

The braking subsystems 106, 107, . . . , normally comprise an auxiliary tank 116, 117, . . . which supplies a braking control system 118, 119, . . . .

The braking control system 118, 119 in turn comprises an electronic unit 120, 121, . . . and a pneumatic panel 122, 123, . . . .

A pressure sensor means 124, 125 sends an electrical signal 126, 127 to the electronic unit 120, 121, which signal indicates the instantaneous pressure value present inside the auxiliary tank 116, 117. One or more pressure sensor means 115 measure the pressure inside the bellows 114 and send an electrical signal 135 to inputs 128, 129, . . . of the electronic units 120, 121.

In modern braking systems, the pressure sensor means 124, 125, . . . are normally integrated inside the pneumatic panel 122, 123, . . . .

Moreover, the most recent braking control systems 118, 119 consist of highly integrated devices, as shown for example in EP3328698, where the pressure sensor means 9a is the equivalent of the pressure sensor means 124, 125 in FIG. 1.

A hysteresis pressure switch 130 measures the pressure present at the outlet of the main tank 104. When the pressure measured is less than the lower hysteresis value, the hysteresis pressure switch 130 energizes a remote control switch 131, which supplies electricity to the compressor 101. When the pressure reaches and exceeds the upper hysteresis value, the hysteresis pressure switch 130 de-energizes the remote control switch 131, which interrupts the supply to the compressor 101. Hysteresis values used in railway applications normally assume values between 2 bar and 3 bar, with the maximum pressure value normally being between 9 bar and 10 bar.

The maximum pressure reached inside the auxiliary tanks 116, 117, 112 always corresponds to the maximum pressure reached by the main tank 104, i.e. to the upper hysteresis value of the hysteresis pressure switch 130, minus pressure drops caused by the non-return valves 109, 110, 111. However, said pressure drops are considered negligible for the purposes of the present invention.

The minimum pressure reached inside the auxiliary tanks 116, 117, 112, . . . normally assumes values that are different between the various auxiliary tanks 116, 117, 112, . . . , as a result of different air consumptions by the various braking subsystems 106, 107, . . . and the pneumatic suspension systems 108. Normally, only one of the auxiliary tanks 116, 117, 112, . . . reaches the minimum pressure which corresponds to the minimum pressure in the main tank 104, so as to activate the hysteresis pressure switch 130, thus causing the energization of the remote control switch 131 with the subsequent ignition of the compressor 101.

In the prior art, maintenance is performed on the compressors according to maintenance cycles predetermined during the design stage on the basis of predictions of use, with said maintenance cycles then remaining unchanged during the entire life of the compressor.

SUMMARY

There is an increasing market demand to carry out maintenance on the compressors on the basis of known concepts such as CBM (condition based maintenance), i.e. based on the real functional condition of the compressor, which is verified periodically during the entire life of the compressor.

Flow measurement is the method for verifying the state of health of the compressor. The filling time is an indication of good or poor functioning of compression sealing members of the compressor. A filling time greater than a nominal value indicates that these members are worn, therefore subject to losses during the compression phase, and must therefore be replaced, in order to avoid potential serious damage to the compressor itself. In this case, the sealing members must be promptly replaced in order to avoid any potential serious damage to the compressor itself.

One method for flow measurement which may be applied to the compressor 101 during its service life on board the railway vehicle is that of measuring the time required by the compressor to bring the pressure from a first initial value to a second final value. The measurement is carried out on a reference value which is constant over time, for example on the volume represented by the entire pneumatic system that comprises the main tank 104, the pipe 105 and the auxiliary tanks 116, 117, 112. If said initial pressure value and final pressure value are not repeated from one measurement to another, the correct method is that of measuring the ratio which has, as the numerator, the difference between the final pressure and the initial pressure and, as the denumerator, the difference between the instant at which the final pressure was measured and the instant at which the initial pressure was measured. This ratio is known as the flow rate, and is directly proportional to the flow of the compressor. A flow rate less than a nominal value indicates that the compression members are worn, therefore subject to losses during the compression phase, and must therefore be replaced.

Another fundamental parameter which is indicative of the remaining life of the compressor is the cumulative time spent by the compressor providing compressed air to the pneumatic system, which may be measured as the sum of times during which the compressor is ignited. The cumulative time analyzed at the same time as the threshold limit value for the filling time is exceeded may indicate if the maintenance cycle prediction was optimistic, correct, or conservative. The information obtained may therefore help to reformulate the maintenance cycle, by adapting to the real use and therefore optimizing the known "life cycle cost," i.e. the cost of the total life of the compressor, as best as possible.

Lastly, the parameter "duty cycle," i.e. the ratio between cumulative time spent by the compressor providing compressed air to the pneumatic system and the cumulative operating time of the train, is an important parameter for evaluating the use of the compressor. Cumulative operating time of the train is understood to mean the overall time in which the train is in the on state. This value is normally provided by the client, i.e. the manufacturer of the railway train, to the provider of the railway system, in order to calculate the maintenance cycle, and to agree on the warranty terms. The exact measurement of the "duty cycle" provides a precise evaluation of the data initially provided by the manufacturer to the provider of the braking system, thereby allowing correct evaluation in the event of complaints from the client during the warranty period.

In the prior art, the state of the hysteresis pressure switch 130, i.e. of the remote control switch 131, is unknown to the electronic units 120, 121, . . . , as this information is not considered functional to the behavior of the braking subsystem 106, 107. The electronic units 120, 121 are therefore lacking the direct information on the ignited or shutdown state of the compressor 101.

BRIEF DESCRIPTION OF THE DRAWINGS

The functional and structural features of a few preferred embodiments of an electronic system for controlling the emergency and service braking according to the invention will now be described. Reference is made to the appended drawings, in which.

DETAILED DESCRIPTION

Prior to explaining a number of embodiments of the invention in detail, it should be noted that the invention is not limited in its application to the design details and configuration of the components present in the following description or illustrated in the figures. The invention is able to assume other embodiment forms and to be carried out or practically realized in other ways. It is to be understood that the phraseology and the terminology have a descriptive purpose and are not intended to be limiting. The use of "include" and "comprise" and the variations thereof are intended to cover the elements given and their equivalents, as well as additional elements and the equivalents thereof.

Figure 1:
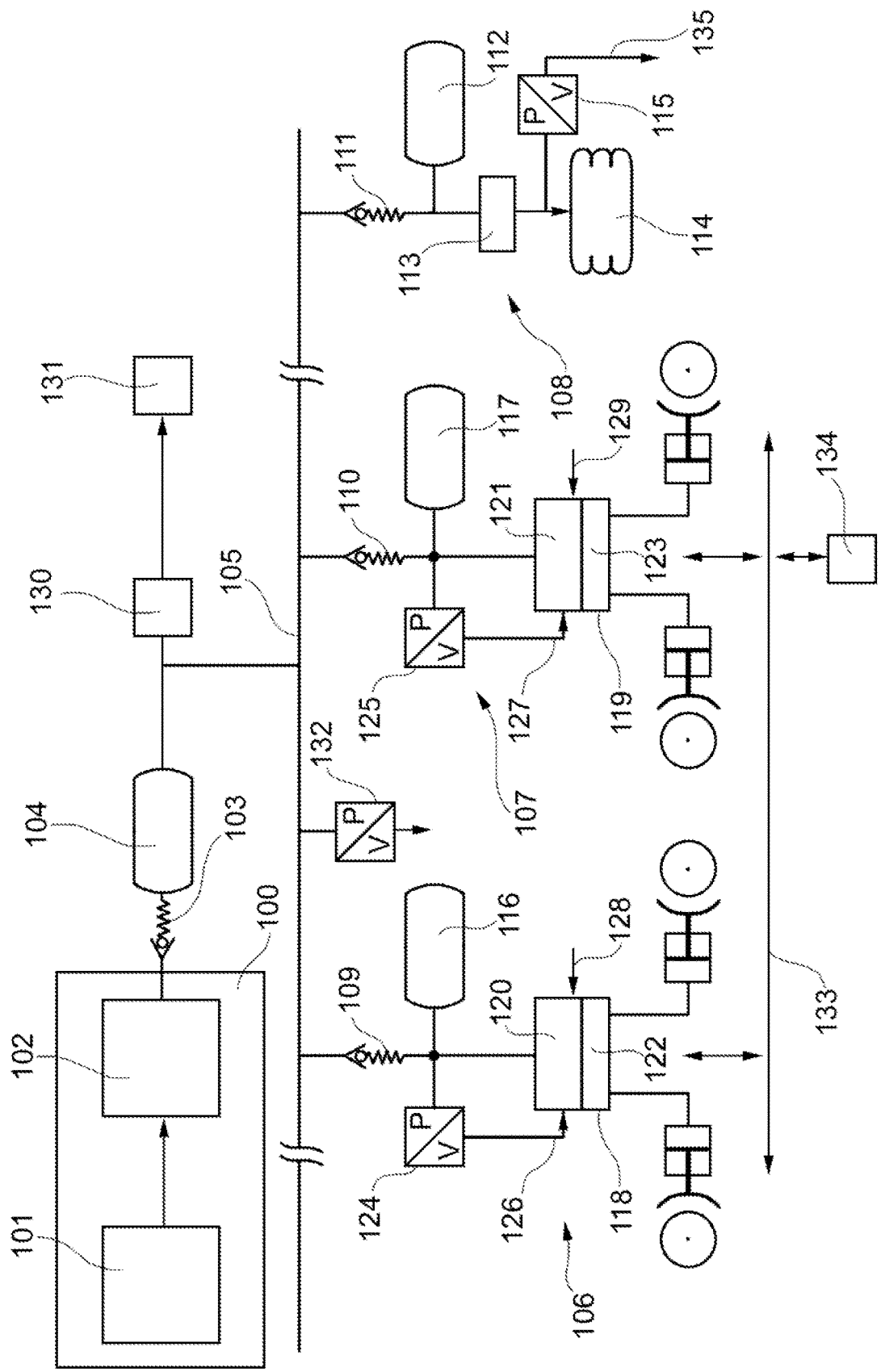
FIG. 1 shows a complete system of a braking system for a railway train.
Figure 2:
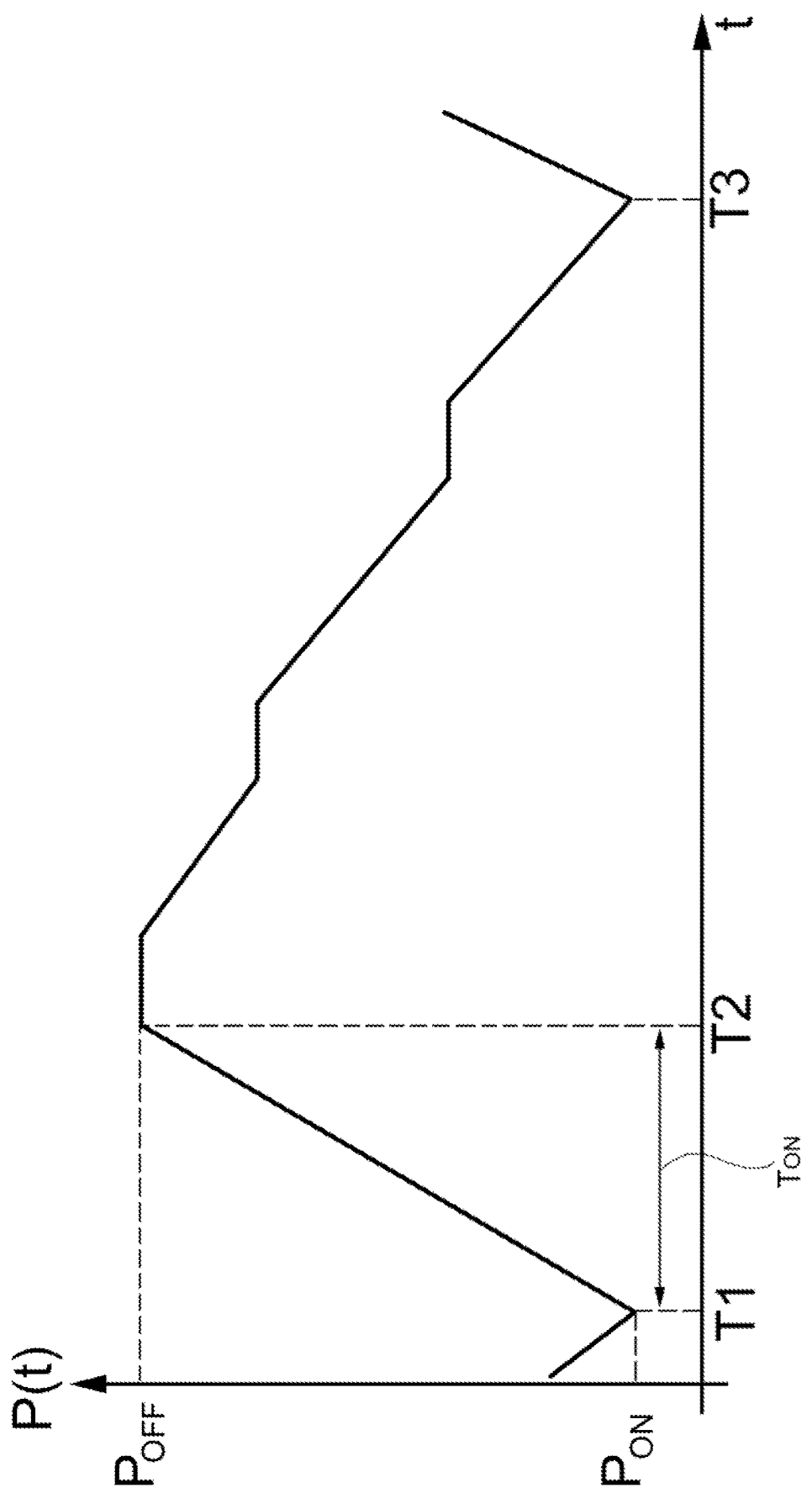
FIG. 2 shows a first example of a filling and emptying cycle of the braking system.

With initial reference to FIG. 2, said figure illustrates an example behavior of a pressure P(t), measured for example by the pressure sensor means 124, 125 if the auxiliary tanks 116, 117, . . . , 112 have simultaneously, in a discharge phase, reached a pressure value Pon which corresponds to the lower hysteresis value for switching the hysteresis pressure switch 130. In this case, the compressor 101 simultaneously fills the main tank 104 and the auxiliary tanks 116, 117, . . . , 112 via the main pipe 105.

The compressor 101 may typically be volumetric and have a flow directly proportional to the rotational speed.

In the railway sector, the compressor is almost always moved by an asynchronous motor powered at a fixed frequency, typically 50 Hz or 60 Hz, in which cases, considering the speed slip typical of the asynchronous motors to be negligible, it is possible to assume constant flow. In this case, the pressure is expected to be an almost constant slope gradient.

By observing the pressure P(t), it is possible to identify an ignition instant T1 as the moment in which the slope of the pressure P(t) passes from a negative value to a positive value. Equivalently, the electronic unit may sample the pressure P(t) signal at a sampling period T and perform the discrete derivative $$(P(nT+1)-P(nT))/T,$$

thus identifying the ignition instant T1 as the instant in which said discrete derivative passes from a negative sign to a positive sign.

Moreover, by observing the pressure P(t), it is possible to identify a shutdown instant T2 as the moment in which the slope of the pressure P(t) passes from a positive value to a null or negative value. Equivalently, the electronic unit 120, 121 may sample the pressure P(t) signal at a sampling period T and perform the discrete derivative $(P(nT+1)-P(nT))/T$, thus identifying the shutdown instant T2 as the instant in which said discrete derivative passes from a negative sign to a positive sign.

To prevent noise present on the electrical signal from being able to generate undue local sign variations, digital filtering techniques for removing the noise that are known to experts in the field of digital processing, such as, but not exclusively, simple moving average FIR (finite impulse filter) algorithms, may be applied.

In light of the above, a method for monitoring a compressor for a railway braking system according to the invention is described in the following.

The railway braking system comprises an air generation and treatment module AGTU 100 which includes a compressor 101, and a main tank 104 arranged to supply a main pipe 105 adapted to distribute compressed air to at least one braking subsystem 106 which comprises an auxiliary tank 116 arranged to supply a braking control system 118.

The method for monitoring a compressor for a railway braking system comprises the step of monitoring a behavior of at least one pressure value P(t) downstream of the main tank 104 or measured at the outlet of the auxiliary tank 116.

The pressure value P(t) may be measured by a pressure sensor means 132 arranged downstream of the main tank 104 or measured by a pressure sensor means 124 arranged at the outlet of the auxiliary tank 116.

Moreover, the method for monitoring a compressor comprises the step of deriving the use and/or state of health of the compressor 101 exclusively on the basis of the time behavior of the measured pressure value P(t).

During the braking phase, the braking systems 118, 119, . . . may have different air consumptions between them. This frequently occurs in practice, for example as a result of different weights bearing on different bogies, thus requiring different braking pressures, thereby causing different emptying of the auxiliary tanks 116, 117, . . . . At the same time, the suspension systems consume air at different times with respect to the braking systems. In particular, the suspensions consume air as the weight bearing on the bogie varies, typically at stations where passengers enter and exit.

The various auxiliary tanks 116, 117, . . . , 112 are not able to compensate one another as a result of the non-return valves 109, 110, . . . , 111.

In this case, only one of the tanks 116, 117, . . . , 112 reaches the pressure value Pon, so as to restart the compressor.

Figure 3:
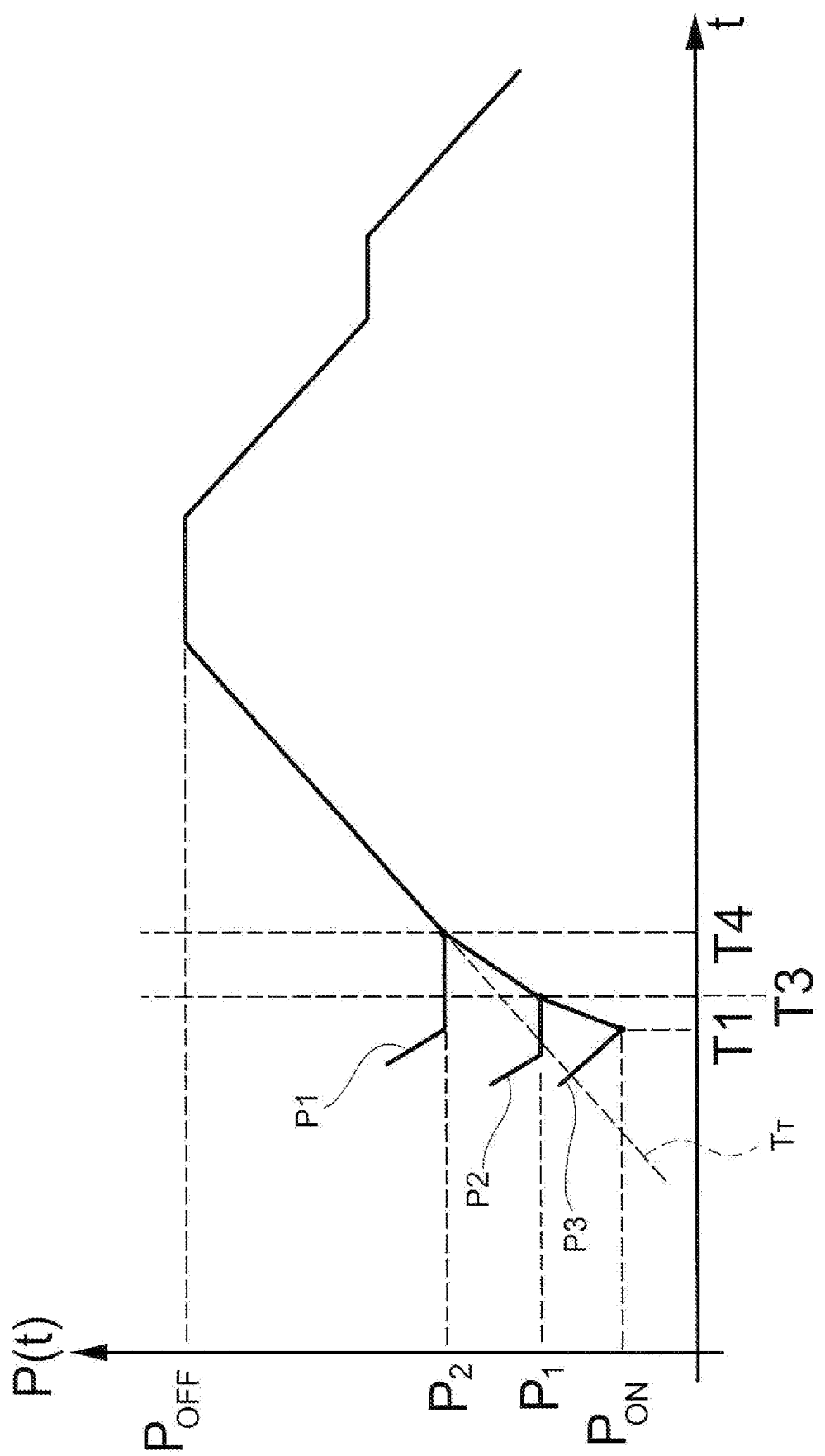
FIG. 3 shows a second example of a filling and emptying cycle of the braking system.

FIG. 3 shows the filling phase described above. Presuming, by way of example, that the three auxiliary tanks 116, 117, 112 have reached the pressure values Pon, P1, P2, respectively, at the ignition instant T1, and assuming the constant flow of the compressor 101, there will be a first phase between the ignition instant T1 and an instant T3, in which phase only the main tank 104 and the auxiliary tank 116 are filled. When the value P1 is reached in the instant of T3, the auxiliary tank 117 is added to the volume to be filled. This event causes an increase in global volume, thus causing a reduction in the slope of the broken curve P(t). Moreover, if the pressure P2 is reached in the instant T4, the tank 112 is added to the volume to be filled, thereby also increasing the global volume and also reducing the slope of the broken curve P(t). It seems evident that the slope which has to be considered for calculating the filling time of the complete installation has to be the slope which belongs to the curve segment comprised between the instant T4 and the shutdown instant T2, i.e. the time interval after the last change in slope.

The method for monitoring a compressor may preferably also comprise the step of determining that a shutdown instant T2 of the compressor 101 coincides with the instant in which a variation of a derivative of the pressure P(t) from a positive value to a nominally null or negative value. The shutdown instant T2 may be determined by an electronic control unit 120 of the braking control system 118.

The method may preferably also comprise the step of determining that an ignition instant T1 of the compressor 101 coincides with an instant in which a variation of a derivative of the pressure P(t) from a negative or nominally null value to a positive value is detected.

The ignition instant T1 may be determined by the electronic control unit 120 of the braking control system 118.

Alternatively, in the presence of further braking systems 119, . . . , the method may comprise the step of determining that the ignition instant (T1) of the compressor 101 coincides with the minor among the instants T1, T3, T4 corresponding to time instants in which respective pressure values P3, P2, P1 of the pressure P(t) are detected, in which a variation of the derivative of the pressure P(t) from a negative or nominally null value to a positive value is detected. The pressures P1, P2, P3, . . . are measured downstream of a plurality of auxiliary tanks 116, 117, . . . .

One or more of said instants T1, T3, T4 may be detected by a plurality of electronic units 120, 121, . . . . The electronic units 120, 121 may be interconnected by means of a communication means 133 and may communicate the respective detected instants T1, T3, T4, . . . between one another.

The further relative pressures P2, P3, . . . may be measured by respective further pressure sensor means 125, . . . .

The further ignition instants T1, T3, T4 may be identified by further electronic control units 121, . . . of further braking control systems 119, . . . , and may be communicated from the electronic control unit 120 and from the further electronic control units 121, . . . by means of a communication means 133.

The method may preferably also comprise the step of calculating a filling ratio by means of a ratio in which the numerator is a difference between a shutdown pressure value Poff of the pressure P(t) at the shutdown instant T2 and a first pressure value P1 of the pressure P(t) in an instant of negative variation T4 coinciding with an instant in which a last negative variation of the derivative of the pressure P(t) occurs, and the denumerator is a difference between the shutdown instant T2 and the instant of negative variation T4.

The electronic unit 120, 121, . . . may identify a value Poff, calculated as the value of P(t) at which the sign of the discrete derivative (P(nT+1)−P(nT))/T passes from positive to null or negative, and compares said value with the nominal value of the pressure switch 130, which nominal value is preloaded into the non-volatile memory of said unit, in order to evaluate the state of health of said pressure switch 130.

By comparing the "filling rate" ratio (Poff-Pon)/(T2-T1) with a range of acceptance preloaded into a non-volatile memory of the electronic unit 120, 121, . . . , said electronic unit 120, 121, . . . may establish the state of health of the compressor, optionally activating a request signal for maintenance if said ratio is lower than a nominal threshold value.

Moreover, the method may therefore also comprise the step of issuing anomaly information when the filling ratio is lower than a predetermined threshold value. The anomaly information may be issued by at least one or by each of the electronic control units 120, 121.

With Pon being known to all the electronic units at least as design data, and Poff as the pressure value measured in real time, the nominal "filling rate" ratio of the system may be calculated by each electronic unit as (T4-T2)/(Poff-P2).

In a further aspect, the method may also comprise the step of cyclically calculating an ignition interval by means of the electronic control units 120, 121, as the difference between the shutdown instant T2 and the ignition instant T1 or Tm.

The electronic unit 120, 121, . . . may add up the successive (T2-T1), thus cumulating the actual use time of the compressor.

The electronic unit 120, 121, . . . counts the total time in which the braking system is on, i.e. active. In this way, by dividing the actual use time of the compressor by the total time in which the braking system is on, the electronic unit 120, 121 . . . continuously calculates the "duty cycle" of the compressor and memorizes said cycle in the non-volatile memory of said electronic unit 120, 121, . . . , in order to then provide said duty cycle to maintenance staff for the manufacturer of the railway train to potentially evaluate the correct use.

The method may therefore also comprise the steps of calculating a total operating time of the compressor 101 as the sum of the ignition intervals calculated during the life of the compressor 101, and memorizing the total operating time.

The total operating time of the compressor 101 may be calculated by means of the electronic control units 120, 121, . . . .

Figure 4:
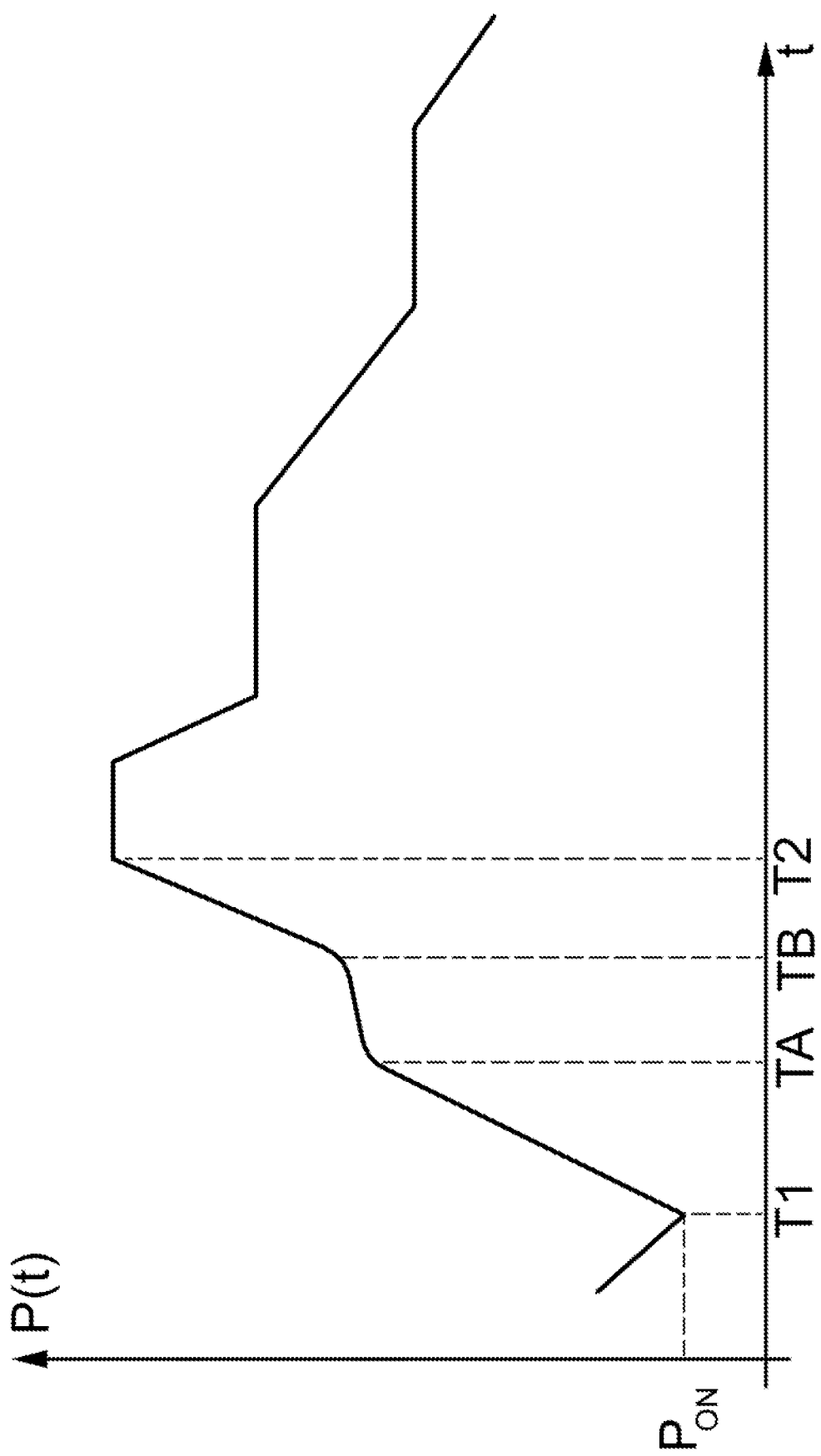
FIG. 4 shows a third example of a filling and emptying cycle of the braking system.

FIG. 4 shows a further recurring case in which, during the filling phase, an event occurs which leads to air consumption, such as a braking event or a variation in weight of the vehicle so as to require the bellows of the suspensions to be filled. This potential event leads to a decrease in the slope for the entire duration of said event, as shown between TA and TB in FIG. 4. In this case, the electronic unit merely uses the measurement T2-T1 to calculate the cumulative use time and the duty cycle, discarding the estimate of filling time which would be distorted by the event that has happened between TA and TB.

If a further pressure sensor means 132 is present for the direct measurement of the pressure in the main pipe 105, and the corresponding signal is available at at least one of the electronic units 120, 121, . . . , said at least one electronic unit may deduce the information on filling time, cumulative time and duty cycle by using the same criteria described thus far, but without the need to have to identify the time Tm between more T1, T2, . . . .

If a communication means 133 is available for communication between the control units 120, 121, . . . , said control units 120, 121, . . . transmit between one another the exact values Pon, P1, P2, . . . , Poff, as well as the "filling rate" ratio subsequently calculated, for mutual comparison and validation.

It is also possible to transmit at least one value among the values of the filling ratio or the total operating time or the operating duty cycle from a central unit 134, or, alternatively or additionally, to transmit at least one value among the values of the filling ratio or the total operating time or the operating duty cycle from on-board the train to ground by means of a wireless system.

Still further, the method may further comprise the step of issuing an information signal when at least one of the ignition time or shutdown time T1, T2 exceeds a relevant threshold limit. The method may also comprise the step of issuing at least one of the shutdown pressure value Poff of the pressure P(t) and the ignition pressure value Pon of the pressure P(t) exiting from respective tolerance bands, and/or when at least one filling time exceeds a predetermined limit value.

The information signal may be issued by at least one or by each of the electronic control units 120, 121, . . . .

It seems evident that this method, based on the observation of the profile of P(t), is advantageously more precise and reliable with respect to the measurement of the nominal filling time carried out by simply measuring the time in which the pressure switch 130 or the remote control switch 131 remain activated, in this case it not being possible to take into account the progressive increase in volume to be filled.

Various aspects and embodiments of a method for monitoring the use and state of health of a compressor of a railway braking system according to the invention have been described. It is understood that each embodiment may be combined with any other embodiment. Moreover, the invention is not limited to the embodiments described, but may be varied within the scope defined by the appended claims.

The invention claimed is:

1. A monitoring method of a compressor for a railway braking system, said railway braking system comprising an air generation and treatment module AGTU which includes the compressor, a main tank arranged to supply a main pipe adapted to distribute compressed air to at least one braking subsystem which comprises an auxiliary tank arranged to supply a braking control system;
the monitoring method characterized in that it comprises the steps of:
monitoring a behavior of at least one pressure value measured downstream of the main tank or measured at the outlet of the auxiliary tank; and
deriving the use and/or state of health of the compressor exclusively on the basis of a time behavior of the measured pressure value.

2. A method according to claim 1, further comprising the step of:
determining that a shutdown instant of the compressor coincides with an instant in which a variation of a derivative of the pressure from a positive value to a nominally null or negative value is detected.

3. A method according to claim 2, further comprising the step of:
determining that an ignition instant of the compressor coincides with an instant in which a variation of a derivative of the pressure from a negative or nominally null value to a positive value is detected.

4. A method according to claim 3, further comprising the step of:
calculating a filling ratio by means of a ratio in which at the numerator it is placed a difference between a shutdown pressure value of the pressure at the shutdown instant and a first pressure value of the pressure in an instant of negative variation coinciding with an instant in which a last negative variation of the derivative of the pressure occurs, and at the denumerator it is placed a difference between the shutdown instant and the instant of negative variation in which a last negative variation of the derivative of the pressure occurs.

5. A method according to claim 4, further comprising the step of:
issuing an anomaly information when the filling ratio is lower than a predetermined threshold value.

6. A method according to claim 4, further comprising the step of:
cyclically calculating an ignition interval as the difference between the shutdown instant and the ignition instant.

7. A method according to claim 2, further comprising the step of:
- determining that an ignition instant of the compressor coincides with the minor among instants corresponding to time instants in which are detected respective pressure values of the pressure in which a variation of the derivative of the pressure from a negative or nominally null value to a positive value is detected;
- said pressure values being measured downstream of a plurality of auxiliary tanks.

8. A method according to claim 2, further comprising the step of:
- issuing an information signaling when at least a filling time exceeds a predetermined limit value.

9. A method according to claim 1, further comprising the steps of:
- calculating a total operating time of the compressor as the sum of ignition intervals calculated during the life of said compressor, and
- memorizing the total operating time during the life of said compressor.

10. A method according to claim 9, further comprising the steps of:
- calculating an operating duty cycle of the compressor as a ratio between the calculated total operating time and an operating time of a railway vehicle.

11. A method according to claim 10, further comprising the step of:
- transmitting at least one value among values of a filling ratio or the total operating time or the operating duty cycle to a central unit.

12. A method according to claim 11, further comprising the step of:
- transmitting at least one value between the values of the filling ratio or the total operating time or the operating duty-cycle from on-board the railway vehicle to ground by means of a wireless system.

13. A method according to claim 12, further comprising the step of:
- issuing an information signaling when at least one of a shutdown pressure value of the pressure at a shutdown instant and an ignition pressure value of the pressure at an ignition instant exit from respective tolerance bands.

* * * * *